June 26, 1962  O. R. IDING  3,040,851
MULTIPLE UNIT MOTOR CONTROL CIRCUIT
Filed June 15, 1959  2 Sheets-Sheet 1
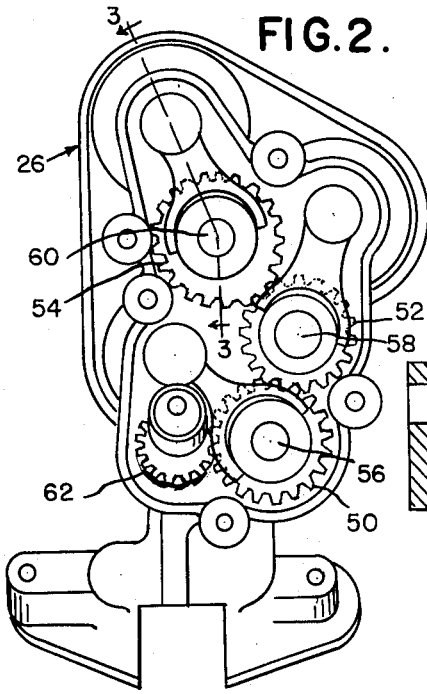
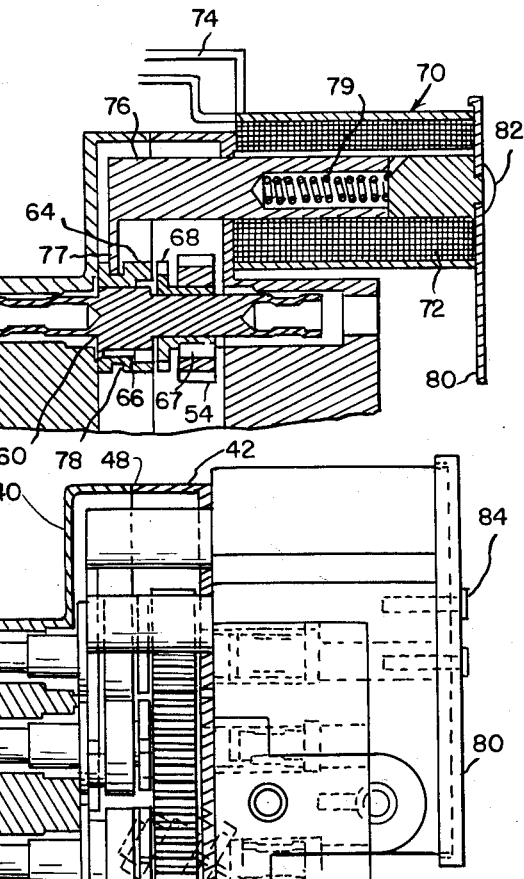
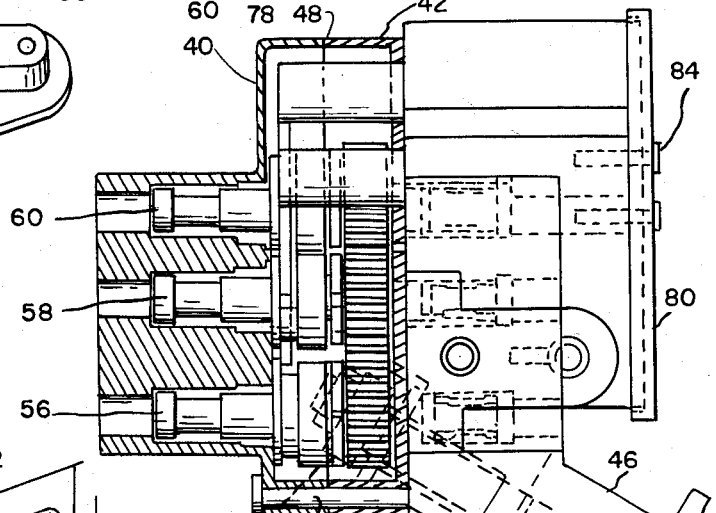
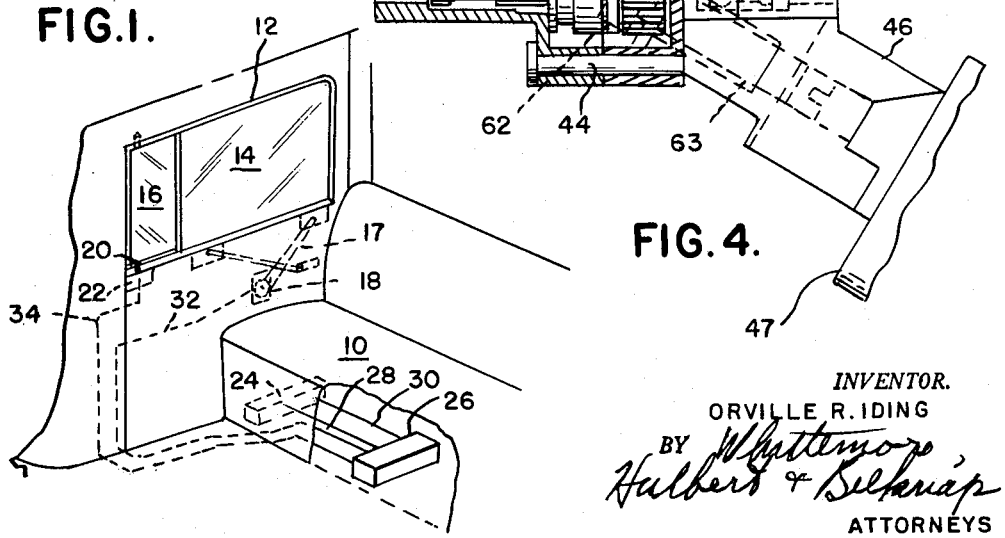
INVENTOR.
ORVILLE R. IDING
BY *Whittemore,*
*Hulbert & Belknap*
ATTORNEYS

United States Patent Office 3,040,851
Patented June 26, 1962

3,040,851
MULTIPLE UNIT MOTOR CONTROL CIRCUIT
Orville R. Iding, Detroit, Mich., assignor to Ferro Stamping Company, Detroit, Mich., a corporation of Michigan
Filed June 15, 1959, Ser. No. 820,476
11 Claims. (Cl. 192—.02)

The present invention relates to a multiple unit motor control circuit for an automotive vehicle.

It is an object of the present invention to provide, in an automotive vehicle, a single motor, selectively engageable operative connections between the motor and a number of adjustable components of the vehicle such as seats, windows, and the like, and means operable automatically by selective connection of the motor to a particular movable component to control the power output of the motor to make it appropriate for the particular movable component being adjusted.

More specifically, it is an object of the present invention to provide in a motor vehicle a single relatively powerful electric motor, mechanical drive means extending from said motor to a plurality of movable or adjustable components of the motor vehicle such for example as seats, windows, and the like, separate means including a solenoid for connecting said motor selectively to each of said mechanical drive means, each of said solenoids being in series with said motor and having a resistance selected to control the output of the motor in accordance with the power required to operate the movable or adjustable component.

Other objects and features of the invention will become apparent as the description proceeds, especially when taken in conjunction with the accompanying drawings, illustrating preferred embodiments of the invention, wherein:

FIGURE 1 is a fragmentary perspective view diagrammatically illustrating the single motor for effecting a plurality of adjustments of movable components of the automobile.

FIGURE 2 is an elevational view with parts removed of selectively operable power mechanism.

FIGURE 3 is a section on the line 3—3, FIGURE 2.

FIGURE 4 is a side elevational view of the mechanism shown in FIGURE 2, with parts removed and parts in section.

Figure 6:
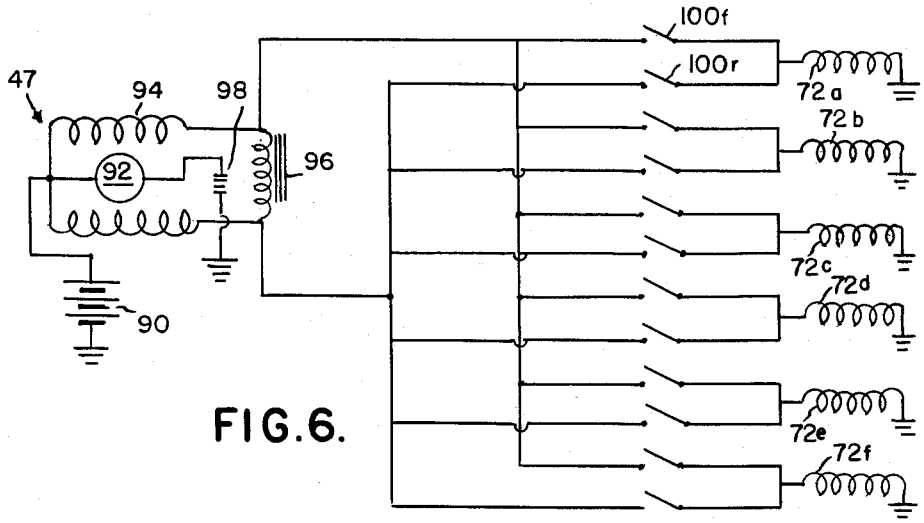
FIGURE 6 is a wiring diagram showing a shunt wound motor and the control circuit therefor.

Referring first to FIGURE 1 there is shown a portion of the interior of an automobile including a seat 10, and a door 12 having a vertically movable window 14 and a vent wing 16 mounted for adjustment about a vertical axis.

In accordance with the present invention means are provided for effecting power adjustment of the seat, vertical movement of the window 14, and swinging movement of the vent wing 16. It will be understood that these particular movable components of the automobile are selected for illustration but that the invention relates generally to any movable component including parts such as power actuated convertible tops, movable rear decks, etc.

As seen in FIGURE 1, the window 14 has connected thereto more or less conventional regulator mechanism indicated at 17 including a rotating sector 18. The pivot support 20 of the vent wing 16 extends downwardly into a housing 22 where it is connected to a suitable drive element. Under each end of the seat there is provided seat adjusting mechanism diagrammatically indicated at 24 which may be of any conventional or well known type.

Mounted at a convenient point in the vehicle such for example as beneath the seat 10, is a power drive unit indicated at 26. As will subsequently appear in detail, the power drive unit includes a single relatively powerful electric motor adapted to be clutched through solenoid actuated clutches to any one or more of a plurality of flexible drive cables. A pair of such cables are indicated at 28 and 30 extending to the seat adjusting mechanism at the right hand end of the seat 10. It will of course be appreciated that a similar pair of cables normally will extend to identical seat adjusting mechanism at the left hand end of the seat. In addition, a flexible drive cable 32 is led into the interior of the door 12 and extends to the sector 18 of the window regulating mechanism 17. Again, details of this mechanism are not significant in the present invention but the connection may be in the form of a worm meshing with the toothed sector.

A fourth cable 34 is also led to extend into the interior of the door through an edge thereof and leads to the housing 22 where it terminates in a rotary drive element suitably connected to the pivot support of the vent wing 16. It will of course be appreciated that similar flexible drive cables extend to the window and vent wing at the left hand side of the vehicle. Actually, additional flexible drive cables may be provided for regulating the rear windows and in some cases three flexible drive cables will extend from the power unit to each of the seat adjusting devices.

Referring now to FIGURES 2–4 there is illustrated in detail the type of power unit indicated diagrammatically at 26 in FIGURE 1. In FIGURES 2–4 the power drive unit is shown having three output shafts some or all of which may be adapted for connection to two oppositely extending cables. It will of course be understood that the number of output shafts may be increased to any desired number.

The power unit comprises a housing formed of portions 40 and 42 connected together by studs 44. The housing portion 42 has secured thereto a mounting bracket 46 by means of which it is connected to a motor 47. The two parts of the housing when assembled together define a gear box 48 in which are located a plurality of gears 50, 52 and 54. The axes of these gears are parallel to each other and the gears are mounted in meshing relation on shafts 56, 58 and 60 respectively. Each of the aforementioned gears is mounted for free rotation on its shaft.

Within the gear box 48 is mounted a drive gear 62, its axis being inclined to the shaft 56 which supports the gear 50. The gears 50, 52 and 54 may conveniently be spur gears as indicated in FIGURE 4, in which case the drive gear 62 is a helical gear of the proper helix angle to mesh with the gear 50 in driving relation thereto. The gear 62 is carried by a shaft 63 adapted to be keyed or otherwise secured directly to the shaft of the motor 47. When the motor is energized in forward or reverse direction the gears 50, 52 and 54 being in mesh with each other, all rotate freely on their respective shafts.

In order to effect selective control of remote mechanisms each of the shafts 56, 58 and 60 has a clutch mechanism associated therewith and with the related gear. In FIGURE 3 the shaft 60 is shown as having a clutch element 64 which is keyed to the shaft as indicated at 66 but is longitudinally slidable thereon. The gear 54 is keyed as indicated at 67 to a clutch element 68.

In order to selectively control rotation of the shafts such as the shaft 60, solenoid means indicated generally at 70 is provided which includes windings 72 adapted to be energized by electrical conductors indicated at 74. The solenoid includes the plunger 76 having a fork 77 engageable with an annular groove 78 on the clutch element 64. The plunger 76 is biased outwardly of the windings by a compression spring 79 and is thus effective to shift the clutch element 64 out of engagement with the clutch element 68 when the windings are de-energized.

When the windings are energized the plunger 76 moves to the right as seen in FIGURE 3, thus engaging clutch elements 64 and 68 and effecting rotation of the shaft 60 as a result of the rotation of the gear 54. It will of course be appreciated that each of the gears 50 and 52 is selectively controlled by a separate solenoid and that further, a separate solenoid will be provided for each of any additional gears provided in the mechanism.

The solenoids 70 are secured to a cover plate 80 as by rivets 82 and the entire cover plate is attached to the housing portion 42 by screws 84.

As previously mentioned, each shaft such as the shaft 60 shown in FIGURE 3, may be adapted to drive a single flexible cable or it may be adapted to drive a pair of oppositely extending flexible cables intended to drive two mechanisms in timed relation to each other. Thus for example, if the shaft 60 is to drive a seat adjusting cable such as 28 or 30, it will normally have a similar cable extending from its opposite end to the seat adjusting mechanism at the opposite end of the seat. On the other hand, if the shaft is intended to rotate a drive cable leading to a single mechanism such for example as a window regulator, then it will normally be provided with a single flexible drive shaft.

Referring again to FIGURE 1, it will of course be apparent that the power required to effect movement of the movable or adjustable vertical components differs greatly. Thus for example, the power required to effect swinging of the vent wing 16 is small compared to the power required to lower, and particularly to raise the window 14. Similarly, the power required to effect adjustment of the seat 10 is or may be many times greater than that required to effect adjustment of the window 14. Moreover, it is unsafe to apply excessive power to devices such as the window 14 and vent wing 16. In some cases a window may be accidentally raised when a child is leaning through the window opening. Moreover, as is usual in window regulation, the movement of the window is continued until it is fully opened or closed and the motor is permitted to stall. If excessive power is provided damage or possible breakage may occur.

Figure 5:
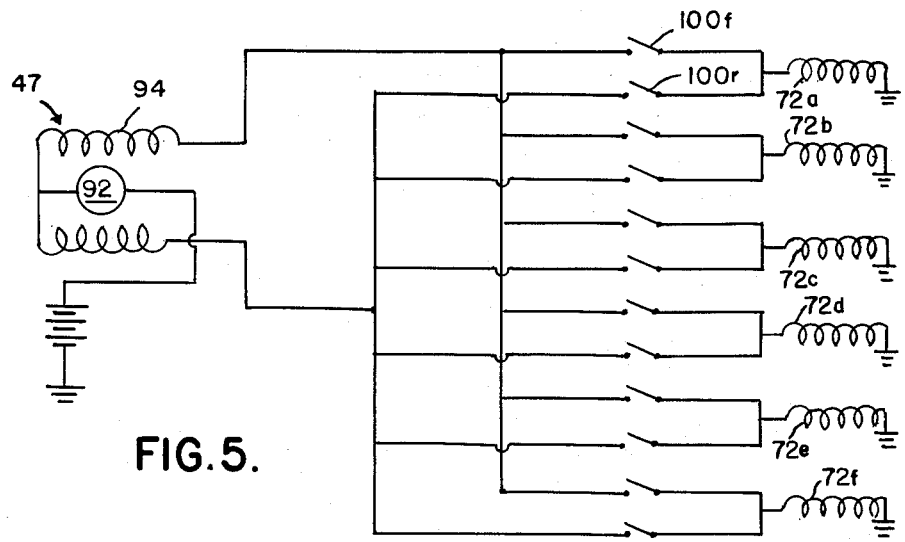
FIGURE 5 is a wiring diagram showing a series wound motor and the control circuit therefor.

In accordance with the present invention means are provided in the control circuit of the motor and the solenoids which selectively couple the motor to a desired movable component of the vehicle, which regulates the power output of the motor in accordance with the particular component to which it is connected. This is accomplished by the circuits illustrated in FIGURES 5 and 6. In FIGURE 5 the motor 47 is indicated as a series motor in which current from the battery 90 flows through the armature 92 and thence through one or the other of the field windings 94. At the right of the figure are illustrated solenoid windings 72a and 72b which are the windings to actuate the solenoids for connecting the motor to flexible driving cables leading to selected components. Forward and reverse switches 100f and 100r are connected in parallel to each solenoid winding to energize the motor in the desired direction and to simultaneously energize the solenoid winding to connect the motor to the selected component. Solenoids 72a and 72b may for example connect power to the vent wings 16. Since little power is required to actuate the vent wings the solenoid windings 72a and 72b are of relatively high resistance. It will be noted that these windings are in series with the motor windings and accordingly, the voltage applied to the motor is substantially reduced and its power output correspondingly diminished. Windings 72c and 72d are the solenoid windings of the solenoids adapted to connect the motor to the window regulating cables 32. Since the power requirement for regulating the windows 14 is substantially greater than that required to adjust the vent wings 16, the resistance of the windings 72c and 72d is substantially less than the high resistance windings 72a and 72b.

The windings 72e and 72f are the windings of the solenoids adapted to connect the motor to the cables 28 and 30 leading to the seat adjustment mechanism. Since relatively greater power is required for effecting seat regulation, particularly vertical movement of the seat when occupied by passengers, the windings 72e and 72f are relatively low resistance windings and may actually have different resistance dependent upon the particular power requirement for the particular adjustment effected.

FIGURE 6 is similar to FIGURE 5 and differs therefrom in that the motor 47 is illustrated as shunt wound and includes a relay 96 adapted to close contacts 98 controlling armature current. Again, it will be observed that field windings 94 are in series with the particular solenoid windings 72a to 72f.

The drawings and the foregoing specification constitute a description of the improved multiple unit motor control circuit in such full, clear, concise and exact terms as to enable any person skilled in the art to practice the invention, the scope of which is indicated by the appended claims.

What I claim as my invention is:

1. Power equipment for a motor vehicle comprising a plurality of adjustable devices requiring substantially different amounts of power to adjust the devices, a single electric motor for effecting selective power adjustment of said devices, mechanical actuating transmissions extending from said motor to each of said devices, each of said transmissions including solenoid actuated mechanism for selectively coupling and uncoupling said transmissions between said motor and said devices, each of said mechanisms including a separate solenoid winding, and a separate control circuit for each of said windings connecting said windings in series with said motor, said control circuits and the windings connected therewith having different electrical resistances which are generally inversely proportional to the power requirements of the particular device coupled to said motor by energization of the corresponding solenoid winding.

2. Power equipment for a motor vehicle comprising a plurality of adjustable devices requiring substantially different amounts of power to adjust the devices, a single electric motor for effecting selective power adjustment of said devices, mechanical actuating transmissions extending from said motor to each of said devices, each of said transmissions including solenoid actuated mechanism for selectively coupling and uncoupling said transmissions between said motor and said devices, each of said mechanisms including a separate solenoid winding, and a separate control circuit for each of said windings connecting said windings in series with said motor, said control circuits and the windings connected therewith having different electrical resistances which are generally inversely proportional to the power requirements of the particular device coupled to said motor by energization of the corresponding solenoid winding, the control circuit being arranged such that simultaneous energization of a plurality of solenoid windings places the windings and resistances associated therewith in parallel grouping in series with the motor so that total resistance in the motor circuit is reduced.

3. Power equipment for a motor vehicle comprising a plurality of adjustable devices requiring substantially different amounts of power to adjust the devices, a single electric motor for effecting selective power adjustment of said devices, mechanical actuating transmissions extending from said motor to each of said devices, operator operated selector means for connecting one or more of said transmission means between said motor and the corresponding devices including means for causing a variation in the voltage drop across the motor in accordance with the transmissions connected and the power required to adjust the devices associated with the transmissions as connected.

4. Power equipment for a motor vehicle comprising a plurality of adjustable devices requiring substantially different amounts of power to adjust the devices, a single electric motor for effecting selective power adjustment of said devices, mechanical actuating transmissions extending from said motor to each of said devices, operator operated selector means for connecting one or more of said transmission means between said motor and the corresponding devices including means to vary the total resistance in series with said motor in accordance with total power requirement thereon.

5. Power equipment for a motor vehicle comprising a plurality of adjustable devices requiring substantially different amounts of power to adjust the devices, a single electric motor for effecting selective power adjustment of said devices, mechanical actuating transmissions including flexible drive cables extending from said motor to each of said devices, each of said transmissions including solenoid actuated mechanism for selectively coupling and uncoupling said transmissions between said motor and said devices, each of said mechanisms including a separate solenoid winding, and a separate control circuit for each of said windings connecting said windings in series with said motor, said control circuits and the windings connected therewith having different electrical resistances which are generally inversely proportional to the power requirements of the particular device coupled to said motor by energization of the corresponding solenoid winding.

6. Power equipment for a motor vehicle comprising a plurality of adjustable devices requiring substantially different amounts of power to adjust the devices, a single electric motor for effecting selective power adjustment of said devices, mechanical actuating transmissions including flexible drive cables extending from said motor to each of said devices, operator operated selector means for connecting one or more of said transmission means between said motor and the corresponding devices including means to vary the voltage drop across the motor in accordance with total power requirement thereon.

7. Power equipment for a motor vehicle comprising a plurality of adjustable devices requiring substantially different amounts of power to adjust the devices, a single electric motor for effecting selective power adjustment of said devices, mechanical actuating transmissions including flexible drive cables extending from said motor to each of said devices, operator operated selector means for connecting one or more of said transmission means between said motor and the corresponding devices including means to vary the total resistance in series with said motor in accordance with total power requirement thereon.

8. In a motor vehicle having a plurality of movable components such as seats, windows and the like, separate means for adjusting each of said components requiring substantially different power to operate the same, a single electric motor having sufficient power to operate the adjusting means of the component which is most difficult to operate, transmission means for selectively connecting said motor to said separate adjusting means, separate resistances of different value, and means to connect an appropriate one of said resistances in the motor circuit in accordance with the particular separate adjusting means connected to said motor.

9. In a motor vehicle having a plurality of movable components such as seats, windows and the like, separate means for adjusting each of said components requiring substantially different power to operate the same, a single electric motor having sufficient power to operate the adjusting means of the component which is most difficult to operate, transmission means for selectively connecting said motor to said separate adjusting means, a plurality of separate solenoid actuated clutches operable to connect said motor to a selected one or more of said adjusting means, and separate solenoid circuits having different electrical resistances selected to provide a motor power output appropriate for the selected adjusting means, said solenoid circuits being in series with the circuit of said motor.

10. Control means for an electric motor adapted to be coupled to one or more different mechanical devices, comprising clutch solenoids operable when energized to effect coupling of the motor to one or more devices and arranged to be in a separate circuit in series with the motor when energized, said separate circuits having different values of electrical resistance selected when in series therewith to limit the power of the motor to that appropriate for the particular mechanical device to be coupled to the motor.

11. Power equipment for a motor vehicle comprising a plurality of adjustable devices requiring substantially different amounts of power to adjust the device, a single electric motor operably associated with said devices for effecting selective power adjustment of said devices, mechanical actuating transmissions extending from the motor to each of said devices, and selector means for connecting one or more of said transmission means between said motor and the corresponding device including means for varying the electric parameters of the motor to regulate the power of the motor in accordance with the transmissions connected and the power required to adjust the devices associated with the transmissions as connected.

References Cited in the file of this patent

UNITED STATES PATENTS

| | | |
|---|---|---|
| 1,591,417 | Flocco | July 6, 1926 |
| 2,187,012 | Brenner | Jan. 16, 1940 |
| 2,567,127 | Shoffner | Sept. 4, 1951 |
| 2,607,232 | Von Haase | Aug. 19, 1952 |
| 2,630,719 | Humbert et al. | Mar. 10, 1953 |
| 2,743,797 | Whitaker | May 1, 1956 |